United States Patent
Uppalapati et al.

(10) Patent No.: US 9,912,521 B2
(45) Date of Patent: Mar. 6, 2018

(54) SYSTEMS AND METHODS FOR MANAGING CONNECTIONS IN AN ORCHESTRATED NETWORK

(71) Applicant: Dell Products L.P., Round Rock, TX (US)

(72) Inventors: Padmavathi V. Uppalapati, San Jose, CA (US); Chandrasekharan Nilakantan, Cupertino, CA (US); Srinivas Dabir, Saratoga, CA (US); Lunardi Teguh, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 575 days.

(21) Appl. No.: 13/801,410

(22) Filed: Mar. 13, 2013

(65) Prior Publication Data

US 2014/0280817 A1 Sep. 18, 2014

(51) Int. Cl.
*G06F 15/173* (2006.01)
*H04L 12/24* (2006.01)

(52) U.S. Cl.
CPC ........ *H04L 41/044* (2013.01); *H04L 41/0226* (2013.01)

(58) Field of Classification Search
CPC ... H04L 41/044; H04L 41/14; H04L 41/0213; H04L 29/08072; H04L 29/06; H04L 41/22; H04L 41/12; H04L 12/24; H04L 41/0226
USPC ....................................................... 709/223
See application file for complete search history.

(56) References Cited

U.S. PATENT DOCUMENTS

| | | | | |
|---|---|---|---|---|
| 7,463,648 B1 * | 12/2008 | Eppstein | ............... | G06F 9/5011 370/468 |
| 7,487,283 B2 * | 2/2009 | Sivertsen | ............... | G06F 13/409 710/301 |
| 7,574,491 B2 * | 8/2009 | Stein | ................... | H04L 41/0869 709/217 |
| 7,650,415 B1 * | 1/2010 | Peterson | ............... | H04L 65/104 370/401 |
| 8,667,171 B2 * | 3/2014 | Guo | ...................... | G06F 9/5077 709/238 |
| 8,972,725 B2 * | 3/2015 | Arun et al. | ................... | 713/166 |
| 9,038,083 B2 * | 5/2015 | Huang | ............... | G06F 9/45558 709/220 |

(Continued)

*Primary Examiner* — Joseph E Avellino
*Assistant Examiner* — Binod J Kunwar
(74) *Attorney, Agent, or Firm* — Haynes and Boone, LLP

(57) ABSTRACT

An information handling system is provided. The information handling system includes a network infrastructure, the network infrastructure comprising a plurality of network switches in communication with a network controller and a first network server with a network orchestrator running thereon and generating network infrastructure requirements. The information handling system further includes a second network server that has a connection manager running thereon. The connection manager is configured to receive the network infrastructure requirements from the network orchestrator and to convert the specified network infrastructure requirements to instructions suited to the network controller. An associated method for facilitating communication between one or more network orchestrators and network infrastructure is also provided. The information handling system and associated method decouple the network orchestrator from the management of the network infrastructure.

20 Claims, 4 Drawing Sheets

(56) References Cited

U.S. PATENT DOCUMENTS

| | | | | |
|---|---|---|---|---|
| 9,038,151 B1* | 5/2015 | Chua | | H04L 45/02 709/223 |
| 9,240,901 B2* | 1/2016 | Hodges | | H04L 12/5695 |
| 2002/0023045 A1* | 2/2002 | Feilbogen | | G06Q 40/00 705/37 |
| 2004/0181541 A1* | 9/2004 | Groenendaal | | H04L 41/00 |
| 2007/0027973 A1* | 2/2007 | Stein | | H04L 41/0869 709/223 |
| 2007/0294676 A1* | 12/2007 | Mellor | | G06F 8/65 717/139 |
| 2008/0021991 A1* | 1/2008 | Kawai | | H04L 41/00 709/223 |
| 2008/0219253 A1* | 9/2008 | Pozhenko | | H04L 47/10 370/389 |
| 2009/0204964 A1* | 8/2009 | Foley | | G06F 21/53 718/1 |
| 2010/0100722 A1* | 4/2010 | Jiang | | H04L 29/12915 713/150 |
| 2010/0120538 A1* | 5/2010 | DeWitt | | G07F 17/32 463/42 |
| 2012/0060167 A1* | 3/2012 | Salsburg | | G06F 9/50 718/104 |
| 2012/0185913 A1* | 7/2012 | Martinez | | G06F 9/455 726/1 |
| 2012/0233668 A1* | 9/2012 | Leafe | | G06F 9/44526 726/4 |
| 2012/0260250 A1* | 10/2012 | Maeda | | G06F 21/53 718/1 |
| 2012/0266170 A1* | 10/2012 | Zimmerman | | G06F 9/45558 718/1 |
| 2012/0278599 A1* | 11/2012 | Nilakantan et al. | | 713/2 |
| 2013/0061293 A1* | 3/2013 | Mao | | G06F 21/53 726/4 |
| 2013/0091245 A1* | 4/2013 | Miyashita | | H04L 29/08009 709/217 |
| 2013/0097296 A1* | 4/2013 | Gehrmann | | G06F 9/4856 709/223 |
| 2013/0163475 A1* | 6/2013 | Beliveau | | H04L 67/327 370/257 |
| 2013/0198743 A1* | 8/2013 | Kruglick | | G06F 9/45533 718/1 |
| 2013/0223442 A1* | 8/2013 | Narayanan | | H04L 45/64 370/389 |
| 2013/0238641 A1* | 9/2013 | Mandelstein | | G06F 17/303 707/756 |
| 2013/0238785 A1* | 9/2013 | Hawk | | G06F 9/5072 709/224 |
| 2013/0290694 A1* | 10/2013 | Civilini | | H04L 41/28 713/2 |
| 2013/0291062 A1* | 10/2013 | Bursell | | G06F 21/44 726/4 |
| 2013/0329601 A1* | 12/2013 | Yin | | H04L 45/02 370/254 |
| 2014/0053245 A1* | 2/2014 | Tosa | | H04L 63/08 726/4 |
| 2014/0059226 A1* | 2/2014 | Messerli | | G06F 9/5072 709/226 |
| 2014/0074540 A1* | 3/2014 | Evans et al. | | 705/7.25 |
| 2014/0075032 A1* | 3/2014 | Vasudevan | | H04L 41/50 709/226 |
| 2014/0075033 A1* | 3/2014 | Doering et al. | | 709/226 |
| 2014/0075239 A1* | 3/2014 | Prathipati et al. | | 714/4.1 |
| 2014/0075565 A1* | 3/2014 | Srinivasan et al. | | 726/26 |
| 2014/0098710 A1* | 4/2014 | Ong | | H04L 41/12 370/255 |
| 2014/0115165 A1* | 4/2014 | Sonoda | | H04L 47/70 709/226 |
| 2014/0282889 A1* | 9/2014 | Ishaya et al. | | 726/4 |
| 2015/0229583 A1* | 8/2015 | Ponsford | | G06F 9/45533 709/226 |

* cited by examiner

SYSTEMS AND METHODS FOR MANAGING CONNECTIONS IN AN ORCHESTRATED NETWORK

BACKGROUND

1. Technical Field

The present disclosure is related to information handling systems. In particular, embodiments disclosed herein are related to data center implementation and management.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of data centers to provide businesses and consumers with access to vast amounts of data and services. Orchestration is increasingly used to provide the automation of compute resource allocation and deployment within the data center, but data centers also require storage and networking resources. To date, orchestration software is often not able to leverage storage and networking resources of the data center very successfully. In some instances this is because, the orchestrator has limited access to and ability to use the capabilities of the underlying network infrastructure. This limits the useful of orchestration software. For this and other reasons, current data center management implementations have not been entirely satisfactory.

SUMMARY

Consistent with some embodiments, there is provided an information handling system. The information handling system includes a network infrastructure and a network server. The network infrastructure includes a plurality of network switches in communication with a network controller. A network orchestrator and a connection manager run on the network server. The network orchestrator generates network infrastructure requirements. The connection receives the network infrastructure requirements from the network orchestrator and converts the specified network infrastructure requirements to instructions suited to the network controller, such that the network controller can implement the requirements.

Consistent with some embodiments, there is further provided a method for facilitating communication between a network orchestrator and a network infrastructure. The method includes steps of receiving a set of network infrastructure requirements from the network orchestrator at a connection manager and of receiving information from a network controller at the connection manager regarding network technologies present in the network infrastructure. The method further includes a step of converting the set of network infrastructure requirements to a form a set of converted network infrastructure requirements, the converted network infrastructure requirements being implementable by the network controller in communication with the network infrastructure. Additionally, the method includes a step of sending the converted network infrastructure requirements to the network controller for implementation in the network infrastructure.

Consistent with some embodiments, there is provided a computer-readable medium that has data stored therein representing software executable by a server. The software including instructions to facilitate the configuration of a heterogeneous network, which when executed by one or more processors on the server causing the performance of a method. The method includes steps of receiving a set of network infrastructure requirements from the network orchestrator at a connection manager and of receiving information from a network controller at the connection manager regarding network technologies present in the network infrastructure. The method further includes a step of converting the set of network infrastructure requirements to a form a set of converted network infrastructure requirements, the converted network infrastructure requirements being implementable by the network controller in communication with the network infrastructure. Additionally, the method includes a step of sending the converted network infrastructure requirements to the network controller for implementation in the network infrastructure.

These and other embodiments will be described in further detail below with respect to the following figures.

Figure 1:
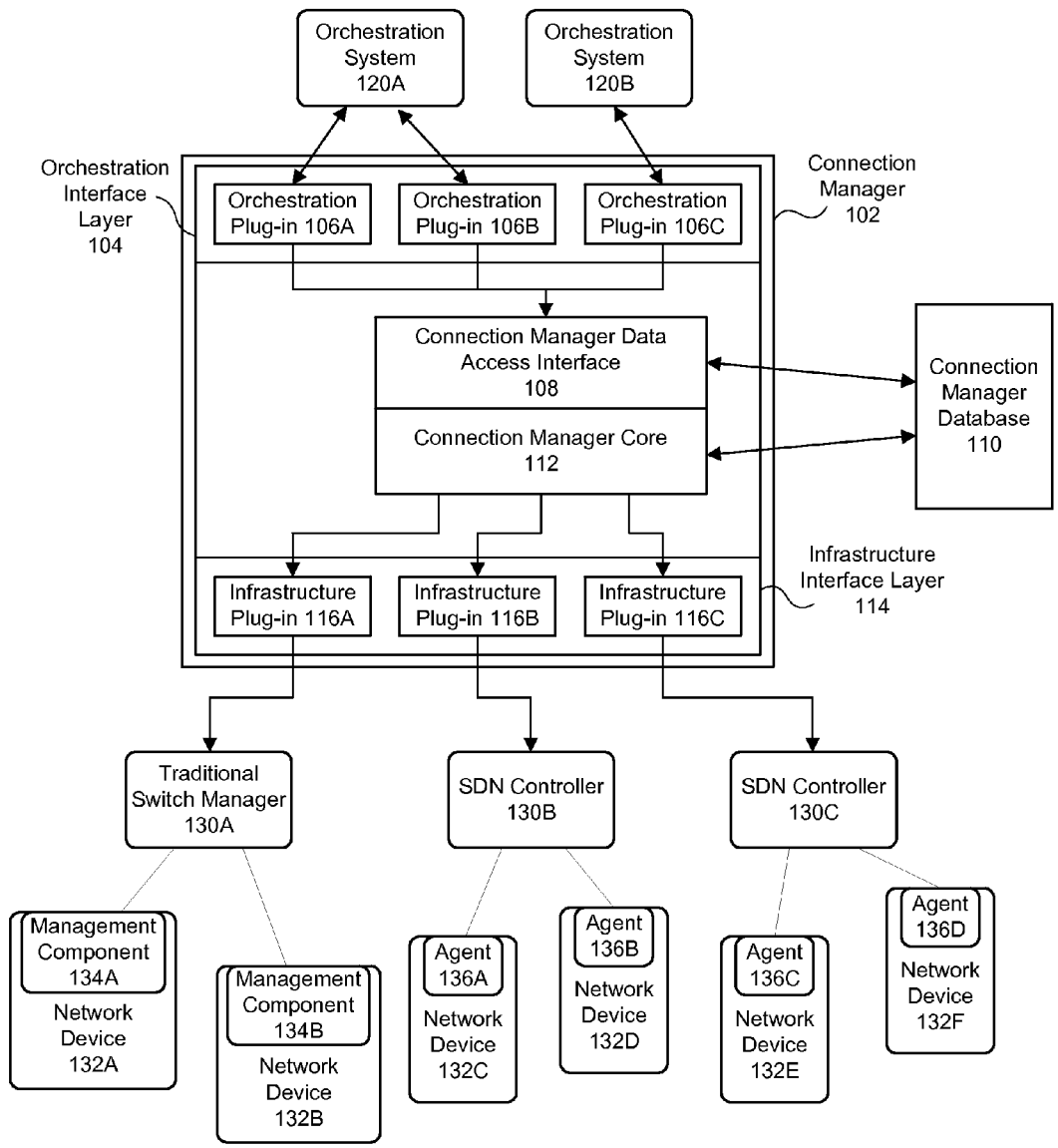
FIG. 1 is a diagram of an information handling system that includes a connection manager.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that store executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, RAM, PROM, EPROM, FLASH-EPROM, any other memory chip or cartridge, any other physical medium, and/or any other medium from which a processor or computer is adapted to read.

FIG. 1 depicts an information handling system 100 that includes a connection manager 102. Connection manager 102 may be coupled to a plurality of orchestration systems and to a plurality of software-defined network controllers and/or traditional switches. As depicted, connection manager 102 is coupled to an orchestration system 120A and an orchestration system 120B on a northbound interface. On a southbound interface, connection manager 102 is depicted as coupled to a traditional switch 130A, a software-defined network (SDN) controller 130B, and a SDN controller 130C. Each of these infrastructure systems is depicted with a plurality of coupled network devices, as will be discussed later. Some embodiments of information handling system 100 may include more or fewer orchestration systems and/or infrastructure systems. Connection manager 102 is configured to translate or convert a set of network infrastructure requirements received from one or both of the orchestration systems 120A or 120B for use in the SDN controllers or the traditional switch. In general, connection manager 102 is configured to allow servers associated with orchestration systems 120A and 120B, which as depicted are heterogeneous orchestration systems, to use available networking resources regardless of the specific type or vendor of the associated switches.

In order to communicate with the orchestration systems 120A and 120B, connection manager 102 includes an orchestration interface layer 104. The orchestration interface layer 104 provides a registration and hosting platform for a plurality of orchestration plug-ins. In the depicted embodiment, the orchestration interface layer 104 includes three orchestration plug-ins: an orchestration plug-in 106A, an orchestration plug-in 106B, and an orchestration plug-in 106C. Other embodiments of information handling system 100 may include more or fewer orchestration systems and orchestration plug-ins. In the depicted embodiment, the orchestration system 120A is in communication with the orchestration plug-in 106A and the orchestration plug-in 106B. Meanwhile, the orchestration system 120B is depicted in communication with orchestration plug-in 106C. In the depicted embodiment, orchestration system 120A and orchestration system 120B are provided by different vendors. For example, orchestration system 120A is an OpenStack orchestrator, while orchestration system 120B is a VCENTER™ orchestrator provided by VMware of Palo Alto, Calif. In such an embodiment, orchestration plug-ins 106A and 106B are specifically designed to facilitate communication with orchestration system 120A. Similarly, orchestration plug-in 106C is configured to communicate with orchestration system 120B.

In operation, connection manager 102 may issue a request for information two orchestration system 102A and/or orchestration system 120 B. In response to this request, orchestration system 120A and/or orchestration system 120B may communicate a set of network requirements to connection manager 102 through the associated orchestration plug-in or plug-ins. The set of network requirements received by connection manager 102 may be received and processed by connection manager data access interface 108, after being normalized by the orchestration plug-ins 106A-C. Connection manager data access interface 108 may gather information from the orchestration plug-ins 106A-C, as well as from a connection manager database 110. Connection manager database 110 may include information regarding the network infrastructure present in the data center. Additionally, connection manager database 110 may include information regarding appliances and applications used within the data center.

When the connection manager data access interface 108 has received the set of network requirements and other information from connection manager database 110, this information is provided to a connection manager core 112. Connection manager core 112 uses this information by converting it or translating it so that it is useful and suited to one of the coupled SDN controllers and/or the traditional switches. In general, the network resources of more than one SDN controller may be used together if the SDN controllers are the same. In such an instance, the SDN controllers and their associated network devices are operated as a single cluster. The converted set of network requirements is then communicated by way of an infrastructure interface layer 114. Similar to orchestration interface layer 104, infrastructure interface layer 114 provides registration and hosting for a plurality of infrastructure plug-ins. As depicted in FIG. 1, infrastructure interface layer 114 includes an infrastructure plug-in 116A, an infrastructure plug-in 116B, and an infrastructure plug-in 116C.

Each of the infrastructure plug-ins is configured for use by a particular SDN controller, or a particular network manager for a particular type of switch. For example infrastructure plug-in 116A is configured to communicate with the traditional switch manager 130A. Similarly, infrastructure plug-in 116B is configured to communicate with SDN controller 130B. As depicted, SDN controller 130B and SDN controller 130C are provided by two different vendors. Each of SDN controllers 130B and 130C may provide certain proprietary features that are not offered by the other, or are presented in different, incompatible formats. However, SDN controllers, even those provided by different vendors, may conform to some basic industry standards. Through the use of infrastructure plug-ins 116A, 116B, and 116C both standard and propriety features of the connected network infrastructure may be presented to connection manager 102.

In other embodiments, many more network devices may be coupled to traditional switch manager 130A, SDN controller 130B, and or SDN controller 130C than are depicted in FIG. 1. Each of network devices 132A-F may be a switch, a router, or a combination thereof. In general, network devices 132A-F are capable of exchanging data and control packets to move information through information handling system 100. As depicted, traditional switch manager 130A is coupled to a network device 132A and a network device 132B, which are traditional switches. The traditional switch manager 130A may be network management software that provides a mechanism by which to configure, manage, and/or monitor associated network devices by communication with a management component running thereon. Management components 134A and 134B represent network management protocols, such as the simple network management protocol (SNMP) or the network configuration protocol (NETCONF), or communicability through a command line interface (CLI). When working with traditional switches, connection manager 102 may require an infrastructure plug-in specific to each type of switch coupled to it.

Similarly, SDN controller 130B is connected to a network device 132C and the network device 132D, and SDN controller 130C is coupled to a network device 132E and the network device 132F. Network devices 132C-F are different in some respects from network devices 132A and 132B. Whereas network devices 132A and 132B are traditional network devices, network devices 132C-F may be pure flexible systems, providing application programming interfaces (APIs) to the coupled SDN controllers, and they may also be run in a hybrid mode. Each of network devices 132C-F includes one of network agents 136A-D running thereon, with network agent 136A running on network device 132C, network agent 136B running on network device 132D, etc. Each of network agents 136A-D is configured to receive information from the coupled controller. The information received by and from the network agents 136A-D may be used to configure paths through information handling system 100.

Connection manager 102 may facilitate communication between orchestration system 120A and SDN controller 130C even in embodiments in which orchestration system 120A is provided by a first vendor and SDN controller 130C is provided by a second vendor. Similarly, connection manager 102 may facilitate communication between an orchestration system 120A and SDN controller 130B, where SDN controller 130B is provided by a third vendor. This may provide significant benefits when the data center owner wishes to use network devices from a first vendor while using an orchestration system provided by a second vendor, or when using multiple orchestration systems within a data center. This may be true even in situations in which a given orchestration system from a first vendor is not compatible with SDN controllers and network devices provided by another vendor.

The orchestration plug-ins may be provided by the vendors of the orchestration systems in some embodiments. Additionally, one or more of the orchestration plug-ins may be provided by a vendor of connection manager 102. Similarly, the vendor of network controller 130C may provide the corresponding infrastructure plug-in 116C, or the vendor of connection manager 102 may provide the plug-in. The orchestration plug-ins 106A, 106B, and 106C may normalize the set of network requirements received from a given orchestration system for use by the connection manager core 112. The normalization performed by the orchestration plug-ins 106A-C may be performed according to APIs provided by the connection manager core 112. In turn, connection manager core 112 may provide normalized network infrastructure requests to infrastructure plug-ins 116A, 116B, or 116C. The receiving infrastructure plug-in then presents the converted set of network infrastructure requirements to the appropriate controller or manager for implementation in coupled network devices. This may entail another conversion process or translation by the infrastructure plug-in to a format suited or tailored to the intended controller or manager. In this way, the orchestration systems 120A and 120B may be decoupled from the management underlying network infrastructure. The connection manager 102 serves as an intermediary between these components of information handling system 100.

Figure 2:
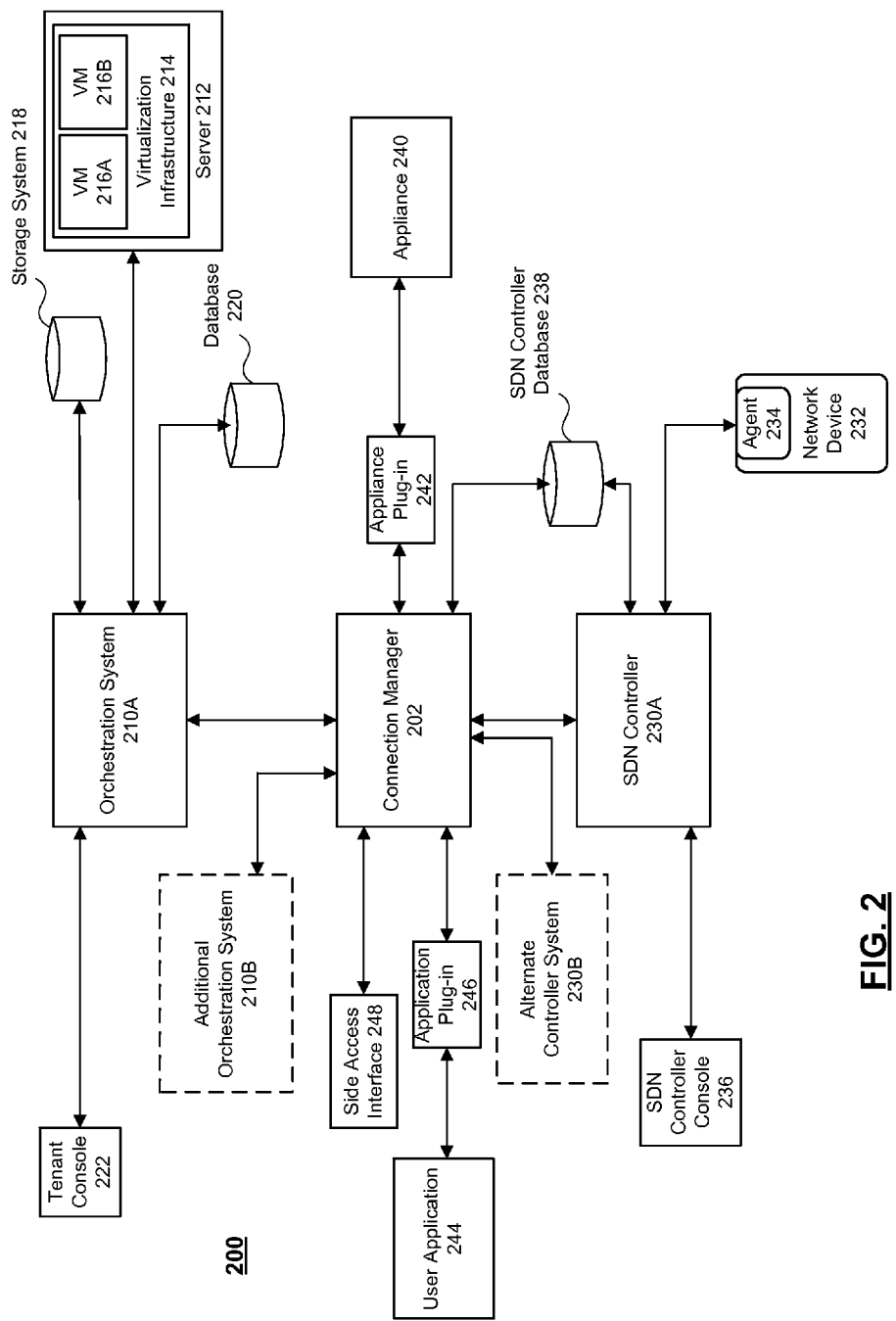
FIG. 2 is a diagram of an information handling system a connection manager coupled in a data center.

FIG. 2 depicts an information handling system 200 that provides an overview of the data center implementing a connection manager 202. The connection manager 202 of FIG. 2 may be similar to the connection manager 102 of information handling system 100. As depicted, connection manager 202 is coupled to an orchestration system 210A and to a SDN controller 230A. As discussed with respect to information handling system 100 of FIG. 1, connection manager 202 can be coupled to a plurality of orchestration systems and to a plurality of network infrastructure control systems. Accordingly, an additional orchestration system 210B is also depicted as coupled to connection manager 202. Similarly, an alternate controller system 230B as shown connected to connection manager 202. Embodiments of information handling system 200 may include more orchestration systems and more SDN controllers and traditional switches coupled to connection manager 202. Connection manager 202 is configured to receive a set of network infrastructure requirements from orchestration system 210A, and in some embodiments from additional orchestration system 210B as well, and to convert that set of network infrastructure requirements for use and implementation by SDN controller 230A.

A plurality of hardware devices are depicted in communication with orchestration system 210A. These hardware devices include at least one server 212, upon which a virtualization infrastructure 214 is running. Many servers running many heterogeneous virtualization infrastructures may be present in embodiments of the information handling system 200. As depicted in the simplified diagram of FIG. 2, virtualization infrastructure 214 supports a plurality of virtual machines including a virtual machine 216A and a virtual machine 216B. Additionally, each of the servers in communication with orchestration system 210A may support a large number of virtual machines. In one embodiment the virtualization infrastructure 214 is a kernel-based virtual machine (KVM). In another embodiment, virtualization infrastructure 214 is a VCENTER™ server, made by VMware of Palo Alto, Calif. In yet other embodiments, orchestration system 210A is in communication with a server having a KVM running thereon and is also in communication with a server having VCENTER™ running thereon, with each virtualization infrastructure supporting a plurality of virtual machines.

Orchestration system 210A is also in communication with a storage system 218 that may include a plurality of hard disk drives and/or solid state drives configured to store data used and generated in information handling system 200. The orchestration system 210 is further coupled to a database 220 that may store, either permanently or temporarily, information regarding inventories, workloads, networks, and network requirements. This database 220 is also coupled to connection manager 202. The tenant console 222 is depicted as being in communication with orchestration system 210A. Tenant console 222 may provide administrators and users of graphical interface by which to communicate with orchestration system 210A. While only one tenant console 222 is depicted, embodiments of information handling system 200 may include a plurality of similar tenant consoles.

Connection manager 202 is coupled to an SDN controller 230A by a southbound interface. SDN controller 230A includes a plurality of sub-components. Thus, SDN controller 230A may include an interface API such as a representational state transfer (REST) API. SDN controller 230A may include a proprietary SDN controller and a standard-based SDN controller, such as an OpenFlow controller. SDN controller 230A is in communication with a plurality of network devices, with an exemplary network device 232 being depicted in FIG. 2. Network device 232 has a network agent 234 running thereon. Network agent 234 may receive control information from SDN controller 230A to facilitate transmission of packets through information handling system 200. The control information received by network agent 234 may include forwarding information, policy-based information, and other control information. In some embodiments an SDN controller console 236 is also provided to facilitate control and use of SDN controller 230A.

Both connection manager 202 and SDN controller 230A are depicted in communication with an SDN controller database 238. SDN controller database 238 may store, either more permanently or temporarily, topologies, policies, logs, statistics, network states, the inventories, and/or other data.

Connection manager 202 may also receive information from a plurality of Network Appliances, like network appliance 240. Network appliance 240 may be a firewall, a load balancer, or other network appliance. Connection manager 202 may communicate with appliance 240 through an appliance plug-in 242. For example, connection manager 202 may request information from appliance 240 regarding services provided by appliance 240. As such a request may be mediated, converted, normalized, or handled by appliance plug-in 242. Additionally, appliance plug-in 242 may receive information from appliance 240 formatted in a proprietary manner. In such embodiments, appliance plug-in 242 may present the proprietary formatted information in a normalized manner. In some embodiments of information handling system 200, appliance plug-in 242 is provided by the same vendor as that providing appliance 240. In other embodiments, appliance plug-in 242 is provided by a vendor of connection manager 202.

Connection manager 202 is also depicted in communication with a user application 244 through an application plug-in 246. User applications like user application 244 may include such as LYNC® provided by Microsoft of Redmond, Wash.

In operation, tenant console 222 may be used by a network administrator to enter commands or requirements to orchestration system 210A. Connection manager 202 may request a set of network infrastructure requirements from orchestration system 210A through an orchestration plug-in such as discussed above with respect to FIG. 1. Connection manager 202 may receive the set of network infrastructure requirements after they are converted or normalized by the orchestration plug-in. Connection manager 202 may also request information from SDN controller 230A regarding available network resources. Using the information obtained from orchestration system 210A and SDN controller 230A, connection manager 202 converts or translates the set of network infrastructure requirements received from the orchestration system 210A to a form that is implementable by SDN controller 230A. In some embodiments, an infrastructure plug-in running on an infrastructure interface layer of connection manager 202 may handle the conversion of the set of normalized network requirements to a proprietary format prior to transmission to SDN controller 230A.

After receiving information from orchestration system 210A, SDN controller 230A, appliance 240, and user application 244, connection manager 202 may normalize or regularize the information and build a connection matrix. The connection matrix may be stored in memory associated with connection manager 202 and/or a database for longer term storage. This connection matrix is used by connection manager 202 to determine end-point connectivity that is required from the network infrastructure as requested by orchestration system 210A. The querying functions of connection manager 202 may be performed based on event-driven notification, such as an addition or subtraction of a compute or networking resource, or may occur through regular polling, or a combination thereof. As depicted in FIG. 2, connection manager 202 uses polling to query orchestration system 210A, appliance 240, SDN controller 230A, and/or user application 244.

In general, the connection manager 202 gathers the capability of orchestration system 210A and SDN controller 230A to facilitate data center operation. For example, in anticipation of a video conference with a large number of participants using an application such as LYNC®, a network operator may request, using orchestration system 210A made by a first vendor, that extra bandwidth be supplied to participants in the video conference. Connection manager 202 may receive this request and convert it for implementation in underlying infrastructure by SDN controller 230A, which is made by a second vendor. SDN controller 230A may configure associated agents to give network traffic associated with the video conference a degree of priority. In this way, the network infrastructure may be adapted even when an orchestration system and an SDN controller are not natively compatible.

Additionally, in some embodiments, connection manager 202 may be used to provide access to functionality in the underlying network infrastructure and/or appliances that is not made accessible by interfaces provided by the orchestration system 210A and/or the additional orchestration system 210B. For example, in embodiments of information handling system 200 in which connection manager 202 is coupled to traditional switches through an infrastructure plug-in, a side access interface 248 may be used to provide additional functionality. For example, while the orchestration system 210A may not natively provide an interface for policy-based forwarding, connection manager 202 may provide a data center operator with an interface through side access interface 248 by which to create policies for implementation by connection manager 202 in the capable network infrastructure.

Figure 3:
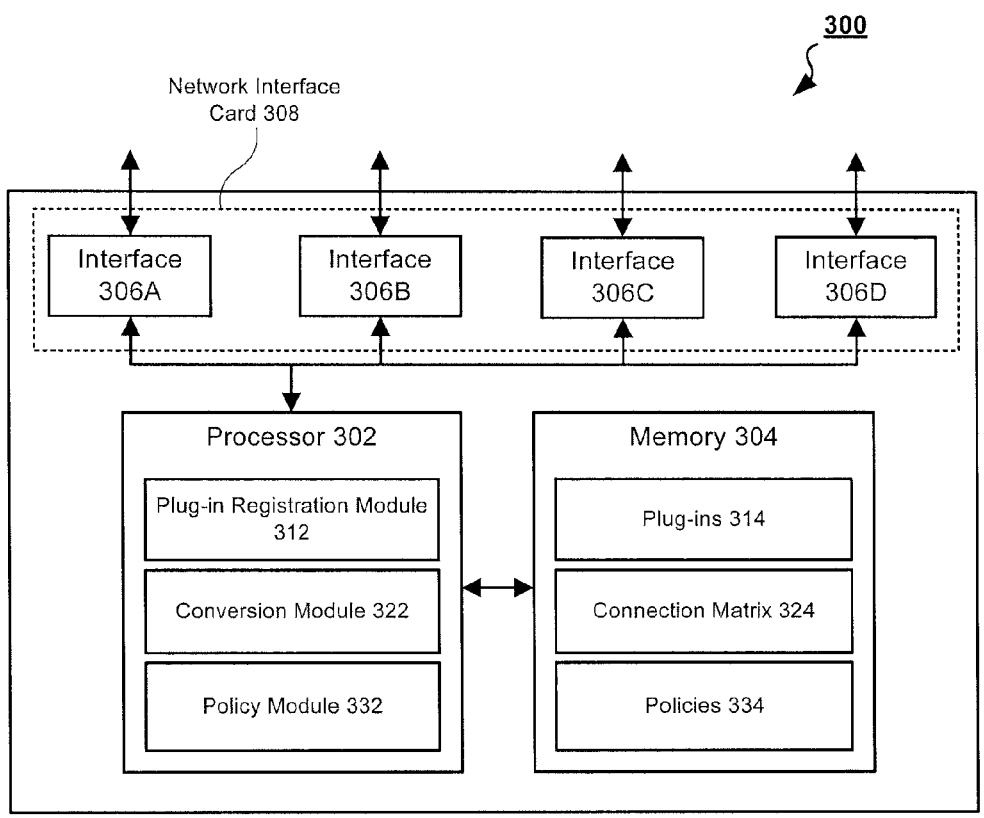
FIG. 3 is a functional diagram of a server upon which the connection manager runs according to an embodiment.

FIG. 3 is a functional diagram of a server upon which connection manager 202 of FIG. 2 or connection manager of 102 of FIG. 1 may run. As depicted, server 300 includes a processor 302 in communication with a memory 304 and a plurality of interfaces 306A, 306B, 306C, and 306D, which may be part of a network interface card 308. The processor 302 has a LINUX™ operating system running thereon in some embodiments. In general, processor 302 may include one or more processors, or one or more processing cores, and may provide a plurality of modules. In some embodiments, these modules may be software stored on memory 304 and executed by processor 302 to provide a number of services or functions. In other embodiments, the depicted modules may be application specific integrated circuits (ASIC). In yet other embodiments, the plurality of modules may be provided by ASICs and by software instructions running on processor 302 or by combinations thereof.

Processor 302 provides a plug-in registration module 312. Plug-in registration module 312 may facilitate the registration or installation and operation of a plurality of plug-ins, such as orchestration plug-ins and infrastructure plug-ins as described above in connection with information handling systems 100 and 200 of FIGS. 1 and 2. In some embodiments, one plug-in registration module is provided for registering orchestration plug-ins, while another plug-in registration module is provided for registering infrastructure plug-ins. Registration may be based upon configuration or a dynamic insertion model. Once registered by plug-in registration module 312, the plug-ins may allow the connection manager to communicate with either traditional or SDN infrastructure. In some embodiments, the orchestration plug-ins and infrastructure plug-ins are stored as plug-ins 314 in memory 304. In such embodiments, the orchestration and infrastructure plug-ins comprise instructions executable by processor 302 that facilitate communication between the connection manager and one or more orchestration systems and between the connection manager and one or more types of network infrastructure.

Processor 302 also provides a conversion module 322 that receives a set of network infrastructure requirements from a coupled network orchestrator and converts them for implementation by a plurality of traditional switches or by a plurality of switches under the control of an SDN controller. Conversion module 322 may receive the set of infrastructure requirements in a plurality of proprietary formats and convert them to normalized formats or requirements. Conversion module 322 may operate in connection with a connection matrix 324. In some embodiments of server 300, the copy of connection matrix 324 is stored in memory 304, while in other embodiments a copy of connection matrix 324 is stored in an external database. Connection matrix 324 includes information about the capabilities, technologies, protocols, and topologies present in the network infrastructure. Using the set of network infrastructure requirements, conversion module 322 may query connection matrix 324 to determine end-point connectivity and services to satisfy the requirements of the network orchestrator. Conversion module 322 may then format the network infrastructure request according to the information present in connection matrix 324 for implementation in the network infrastructure.

A plurality of policies 334 may be stored in memory 304 and implemented by a policy module 332. In embodiments in which the network infrastructure does not provide policy-based forwarding, a user of server 300 may be able to select a number of existing policies or to manually enter desired policies included in policies 334. For example, if the network infrastructure includes traditional network devices or switches that do not natively supported policy-based forwarding or policy-based admission of devices into the network (a "BYOD" environment), policy module 332 may work in conjunction with conversion module 322 to implement policies on the underlying network infrastructure.

As discussed, server 300 includes memory 304, which stores plug-ins 314, connection matrix 324, and policies 334. In the depicted embodiment, memory 304 is solid-state memory, such as RAM or ROM. Embodiments of server 300 may also include a solid-state drive or a hard disk drive as memory 304. Memory 304 may also be a combination of such forms of memory and may include memory external to server 300.

Figure 4:
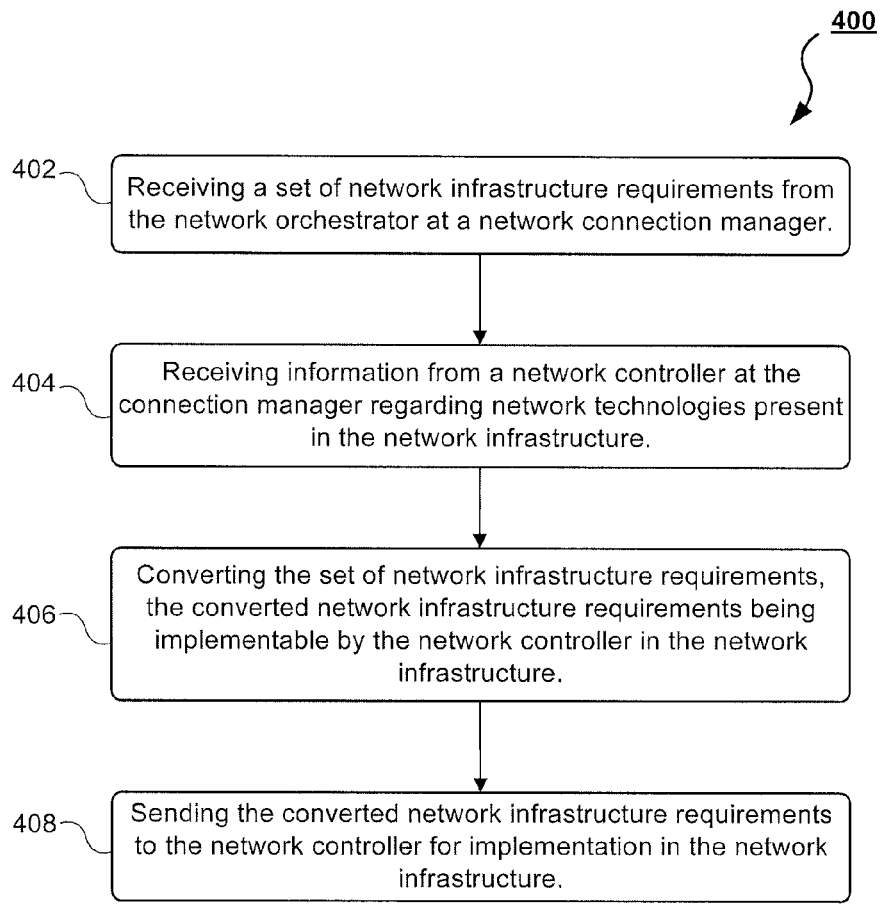
FIG. 4 is a flowchart of a method for facilitating communication between a network orchestrator and network infrastructure in a data center.

FIG. 4 is a flowchart of a method 400 for facilitating communication between a network orchestrator and network infrastructure. As depicted method 400 includes a plurality of steps. Embodiments of method 400 may include additional steps that occur before, in between, or after the depicted steps. As depicted, method 400 begins in step 402 when a connection manager receives a set of network infrastructure requirements from a network orchestrator. The set of network infrastructure requirements may detail the networking needs of a plurality of virtual machines running on a plurality of servers. In step 402, the connection manager receives information from a network controller or manager, or from a plurality of switches directly, regarding network technologies and resources present in associated network infrastructure. The network infrastructure may include a plurality of switches, routers, combination devices, and/or other network devices.

Method 400 continues in step 406, when the connection manager converts the set of network infrastructure requirements into converted network infrastructure requirements capable of being implemented by the network infrastructure either through the network controller or directly by traditional switches. In step 408, the connection manager sends the converted network infrastructure requirements to the network controller for implementation in the network infrastructure. By the operation of method 400, a connection manager may be used to facilitate communication between the network orchestrator and network infrastructure present in a data center.

As discussed, embodiments of method 400 may include other steps in addition to those included in the flowchart of FIG. 4. For example, some embodiments of method 400 may operate in an information handling system having a plurality of network orchestrators associated with heterogeneous servers. In such embodiments, method 400 may also include receiving information from a plurality of network orchestrators. In some embodiments, there may be network infrastructure associated with a plurality of network controllers from a single vendor operated as a cluster that is controlled by a plurality of network controllers from a single vendor. In method 400, selections may be required to select a desired network infrastructure and/or to select a desired network controller from which to receive network infrastructure requirements.

Some embodiments include steps of registering a number of orchestration plug-ins and/or network infrastructure plug-ins in the orchestration interface layer and the network infrastructure interface layer of the connection manager, respectively. The connection manager may periodically request information from the network orchestrator, the network controller, appliances, and applications. In response to the periodic requests, or polling, the network orchestrator, network controller, appliances, and applications may provide information regarding requirements, resources, and network services. The information is received by the connection manager and may be stored in a connection matrix and used when converting network infrastructure requests.

Some embodiments of information handling systems 100 and 200 include tangible, non-transient, machine-readable media that include executable code that when run by a processor, such as computer processor 302 of server 300 in FIG. 3, may cause the processor to perform the steps of method 400 as described above. Some common forms of machine-readable media that may include the steps of method 400 are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The machine-readable medium may be memory 304 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
    a network infrastructure, the network infrastructure comprising a plurality of network switches in communication with a network controller;
    a first network server;
    a network orchestrator running on the first network server and generating network infrastructure requirements, the network infrastructure requirements including at least details of networking needs of a plurality of virtual machines;
    a second network server different from the first network server; and
    a connection manager running on the second network server, the connection manager configured to:
        receive, through an orchestration plug-in, the network infrastructure requirements from the network orchestrator;
        normalize, by the orchestration plug-in, the network infrastructure requirements from one or more proprietary formats supported by a vendor of the network orchestrator to a normalized format;
        build a connection matrix based on the normalized network infrastructure requirements, the connection matrix determining end-point connectivity in the network infrastructure, wherein the connection matrix includes information about protocols present in the network infrastructure;
        translate, by an infrastructure plug-in, the normalized network infrastructure requirements to instructions suited to the network controller based on a type of the network controller to implement the connection matrix in the network infrastructure; and
        transmit, through the infrastructure plug-in, the instructions to the network controller to implement the connection matrix in the network infrastructure.

2. The information handling system of claim 1, wherein the connection manager includes an orchestration interface layer and a network infrastructure interface layer.

3. The information handling system of claim 2, wherein:
    the orchestration plug-in is associated with the network orchestrator, and the orchestration plug-in is installed in the orchestration interface layer and facilitates communication between the network orchestrator and the connection manager; and
    the infrastructure plug-in is associated with the network controller, and the infrastructure plug-in is installed in a network controller interface layer and facilitates communication with the network controller and the connection manager.

4. The information handling system of claim 1, further comprising an additional network orchestrator, and wherein the network orchestrator is in communication with a first type of virtualization infrastructure and the additional network orchestrator is in communication with a second type of virtualization infrastructure.

5. The information handling system of claim 1, wherein the connection manager queries the network orchestrator to receive the network infrastructure requirements.

6. The information handling system of claim 1, wherein the network orchestrator is provided by a first vendor and the network controller is provided by a second vendor.

7. The information handling system of claim 1, wherein the network controller is a proprietary network controller.

8. The information handling system of claim 1, further comprising an additional network orchestrator and an additional network controller, both the additional network orchestrator and the additional network controller being in communication with the connection manager.

9. The information handling system of claim 8, wherein the connection manager is configured to receive network infrastructure requirements from the network orchestrator and selectively convert the network infrastructure requirements to instructions suited to the network controller or to instructions suited to the additional network controller.

10. The information handling system of claim 1, further comprising a network appliance in communication with the connection manager through a network appliance plug-in.

11. A non-transitory computer-readable medium having data stored therein representing software executable by a first server, the software including instructions to facilitate configuration of a heterogeneous network, the instructions when executed by one or more processors on the first server causing performance of a method comprising:
    receiving, through an orchestration plug-in, a set of network infrastructure requirements for a network infrastructure from a network orchestrator running on a second server, at a connection manager running on the first server, wherein the second server is different from the first server, and the set of network infrastructure requirements include at least details of networking needs of a plurality of virtual machines;
    receiving information from a network controller at the connection manager regarding network resources present in the network infrastructure;
    normalizing, by the orchestration plug-in, the set of network infrastructure requirements from one or more proprietary formats supported by a vendor of the network orchestrator to a normalized format;
    building a connection matrix based on the set of normalized network infrastructure requirements, the connection matrix determining end-point connectivity in the network infrastructure, wherein the connection matrix includes information about protocols present in the network infrastructure;
    translating, by an infrastructure plug-in, the normalized network infrastructure requirements to instructions for the network controller based on a type of the network controller to implement the connection matrix in the network infrastructure; and
    sending, through the infrastructure plug-in, the instructions to the network controller for implementation in the network infrastructure.

12. The non-transitory computer-readable medium of claim 11, further comprising periodically requesting information from the network orchestrator and the network controller.

13. The non-transitory computer-readable medium of claim 11, wherein the network orchestrator is an OpenStack orchestrator.

14. The non-transitory computer-readable medium of claim 11, further comprising registering the orchestration and infrastructure plug-ins with the connection manager, each of the orchestration and infrastructure plug-ins facilitating communication between the connection manager and the network orchestrator or the network controller.

15. A method for facilitating communication between a network orchestrator and a network infrastructure, the method comprising:
   receiving, through an orchestration plug-in, a set of network infrastructure requirements from the network orchestrator on a first network server, at a connection manager on a second network server, wherein the second network server is different from the first network server, and the set of network infrastructure requirements include at least details of networking needs of a plurality of virtual machines;
   receiving information from a network controller at the connection manager regarding network technologies present in the network infrastructure;
   normalizing, by the orchestration plug-in, the set of network infrastructure requirements from one or more proprietary formats supported by a vendor of the network orchestrator to a normalized format;
   building a connection matrix based on the set of normalized network infrastructure requirements, and the connection matrix determining end-point connectivity in the network infrastructure, wherein the connection matrix includes information about protocols present in the network infrastructure;
   translating, by a network infrastructure plug-in, the normalized network infrastructure requirement to instructions for the network controller based on a type of the network controller to implement the connection matrix in the network infrastructure; and
   sending, through the network infrastructure plug-in, the instructions to the network controller for implementation in the network infrastructure.

16. The method of claim 15, wherein receiving information from the network controller further comprises receiving information from the network controller in communication with hybrid network devices and a traditional network device manager.

17. The method of claim 15, further comprising providing an interface to facilitate use of a capability presented by the network infrastructure but not supported by the network orchestrator.

18. The method of claim 15, further comprising:
   registering the orchestration plug-in in an orchestration interface layer of the connection manager; and
   registering the network infrastructure plug-in in a network infrastructure interface layer.

19. The method of claim 15, further comprising periodically requesting information from the network orchestrator and the network controller.

20. The method of claim 15, further comprising receiving information about network services from a network appliance at the connection manager.

* * * * *